3,316,201
PROCESS FOR THE MANUFACTURE OF CONCENTRATED AQUEOUS DISPERSIONS OF FLUORINATED OLEFIN POLYMERS
Helmut Hahn, Frankfurt am Main, Claus Beermann, Neu-Isenburg, and Dieter Ulmschneider, Frankfurt am Main, Germany, assignors to Farbwerke Hoechst Aktiengesellschaft vormals Meister Lucius & Bruning, Frankfurt am Main, Germany, a corporation of Germany
Filed Dec. 22, 1964, Ser. No. 420,385
Claims priority, application Germany, Dec. 27, 1963, F 41,644
3 Claims. (Cl. 260—29.6)

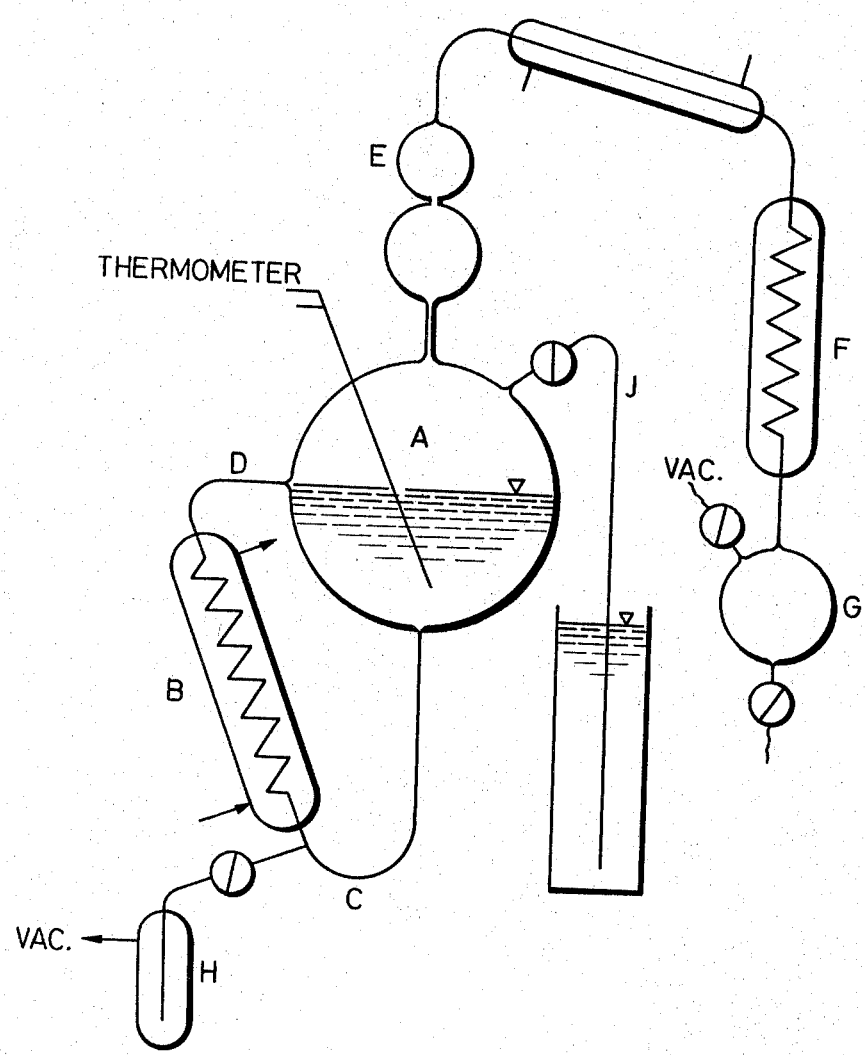

The present invention relates to a process for concentrating aqueous dispersions of fluorine-containing polymers which in particular enables stable concentrated aqueous dispersions of polytetrafluoroethylene to be obtained.

A process for preparing concentrated dispersions of the aforesaid kind has been described, for example, in U.S. Patent 2,478,229. According to that known process a dilute aqueous polytetrafluoroethylene dispersion containing 2 to 8% by weight of solid substance is concentrated by stabilization with a non ionic or anionic surface-active dispersing agent and subsequent reversible coagulation which is brought about by rendering the emulsifier insoluble. When an anionic dispersing agent is used the emulsifier is rendered insoluble by the addition of a mineral acid or by being salted out and when a non ionic compound is used the emulsifier is rendered insoluble by heating the dispersion to the point of turbidity. After the polymer particles have deposited the supernatant aqueous liquid is removed and the polytetrafluoroethylene that has precipitated is peptized again by converting the dispersing agent into a soluble state. When the dispersing agent is an anionic one it is rendered soluble by neutralizing or washing out the residue and when it is a non ionic compound it is rendered soluble by allowing the residue to cool. The concentrated polytetrafluoroethylene dispersion thus obtained contains at least 25% by weight of solid substance.

The aforesaid process has the disadvantage that it can only be applied to dilute aqueous polytetrafluoroethylene dispersions containing 2 to 8% of solid substance. When it is applied to dispersions which contain 15 to 40% by weight of solid substance irreversible coagulation takes place under the conditions under which the aforesaid process is carried out. Besides, the starting dispersions which already have a relatively high degree of concentration often contain electrolytes which in many cases are troublesome.

According to another known process which has been described, for example, in U.S. Patent 3,037,953, 6 to 12% by weight, calculated on the solids content, of a non ionic dispersing agent, for example, p-octyl phenyl polyethylene glycol ether, is added to an aqueous dispersion of polytetrafluoroethylene which contains 30 to 50% by weight of solid substance, then a small amount of an electrolyte, for example, ammonium carbonate, is added and the mixture is heated to a temperature within the range of 50° to 80° C. After a certain time the solid substance deposits without coagulating. After removal of the supernatant aqueous liquid a concentrated aqueous polytetrafluoroethylene dispersion containing 55 to 75% by weight of solid substance is obtained.

That process has the drawback that the concentrated aqueous dispersions which are obtained also contain electrolytes and, besides, have a high content of emulsifier. The deposition of the solid substance can only be brought about when certain dispersing agents are used which have a turbidity point. The process can be applied advantageously only to polytetrafluoroethylene dispersions which initially have a high degree of concentration. When starting dispersions containing less than 30% by weight of solid substance are used, more than 12%, namely up to 20% by weight, calculated on the solids content, of dispersing agent is required. Besides, the deposition of the solid substance takes more than 15 hours. Another disadvantage is that in this case the supernatant aqueous solution contains a considerable amount of polytetrafluoroethylene.

According to German Patent 1,081,221 the above-mentioned drawbacks are avoided by adding to a dilute aqueous dispersion of fluorine-containing polymers in the presence of a non ionic or an anionic dispersing agent a substance which is practically insoluble in water and which is capable of combining with water, for example, silica gel and dried ion exchange resins. By this method part of the water is removed and after separating the solid substance a concentrated dispersion is obtained.

The aforesaid method has the drawback that very large quantities of the water-absorbing, solid drying substance have to be added to the dispersion. In order to concentrate a dispersion containing about 42.5% by weight of solid substance so as to yield a dispersion containing 61.5% by weight of solid substance, the quantity of solid drying compound that has to be added amounts to one third of the weight of the dilute dispersion used. More dilute dispersions, for example, dispersions containing 26% by weight of solid substance, can be concentrated in this manner only to dispersions having a content of 40% by weight.

It has now been found that all the aforesaid disadvantages can be avoided when a dilute aqueous dispersion of fluorine-containing organic polymers, which has been stabilized by means of a non ionic or an anionic dispersing agent, is concentrated by evaporation in vacuo in such a manner that practically no air or other gases can penetrate into the dispersion.

The object of the present invention thus is a process for preparing concentrated aqueous dispersions of fluorine-containing organic polymers from dilute dispersions, according to which a dilute dispersion is concentrated in vacuo by evaporation of the water, the process being carried out in the presence of a non ionic and/or an anionic dispersing agent in such a manner that no gases can penetrate into the dispersion.

When operating under these conditions, a stable concentrated dispersion of fluorine-contaning polymers is obtained which has a solids content within the range of 25 to 75% by weight, preferably 55 to 75% by weight, or more. No coagulation takes place and the starting dispersions may have any concentration whatever. The result is surprising, for when the distillation in vacuo is carried out with the use of a capillary tube (sucking through of air or another gas) or when air enters at any pervious point of the apparatus, coagulation sets in immediately. Even when the evaporation is carried out under normal pressure (the other conditions being the same as those under which an evaporation in vacuo is carried out) by boiling the liquid, about 65% by weight of the solid substance undergoes coagulation after a low degree of concentration (rise of the concentration from 28 to 45% by weight) has been attained.

As dispersing agents there may be used in the concentration process according to the invention the usual non ionic or anionic surface-active substances, for example, water-soluble polyethers, preferably p-nonyl or p-octyl phenol polyethylene glycol ether, coconut oil fat alcohol polyethylene glycol ether, coconut oil fatty acid polyglycol esters or sodium cogasin monosulfate.

The dispersing agent is used in a quantity within the range of 1 to 10% by weight, preferably 3 to 6% by weight, calculated on the solid substance.

The dilute starting dispersions which are to be used in the process according to the invention may be prepared, for example, according to the process described in U.S. Patents 2,534,058 and 2,559,749.

The evaporation in vacuo may be carried out in a stirring apparatus of glass, enamel or another material that does not promote coagulation. The evaporation is carried out while stirring slowly so that boiling is not delayed. In order to prevent any foaming at the beginning of the evaporation, widened columns or other suitable devices are inserted between the evaporation vessel and the piece connecting the vessel with the device for reducing the pressure.

The reduced pressure is preferably such that the temperature of the dispersion to be evaporated is within the range of 10° to 60° C., preferably 20° to 40° C. This corresponds approximately to a pressure of 20 to 200, preferably 30 to 80 mm. Hg. But there may likewise be applied any other reduced pressure. The use of a temperature above 60° C. is avoided since it would promote coagulation. The quantity of water that evaporates can be adjusted to a large extent by the quantiy of heat that is supplied.

The evaporation in vacuo may also be carried out in another device or apparatus, for example, a falling-film evaporator or a rotary evaporator. It may be advantageous, for example, to use a normal evaporation device provided with circulation heating.

The invention will be explained by way of example with reference to the accompanying drawing.

Referring to the drawing, A represents a flask having a capacity of 4 liters and provided with thermometer and an inlet tube J. The dispersion to be concentrated is sucked in vacuo into flask A. The dispersion can leave flask A via connecting piece C and be returned to it via said connecting piece C, heat exchanger B and connecting piece D. When the heat exchanger is heated to about 50° C. the dispersion begins to boil at the top of heat exchanger B and is thereby circulated from flask A via connecting piece C, heat exchanger B and connecting piece D. The evaporated water passes through pieces E which are inserted on top of the flask and it is then condensed in device F. Via inlet tube J dilute starting dispersion may continuously be sucked in. After a certain amount of dilute dispersion, which has been stabilized by means of a dispersing agent, has been introduced and the desired quantity of water has been distilled off, the concentrated dispersion of the polymeric organic fluorine compound is obtained in flask A. The process may also be carried out continuously. In this case care has to be taken in the concentration process that an amount of concentrated dispersion corresponding to the amount of dilute dispersion that is sucked in through inlet tube J is discharged in vacuo through device H. In flask A and in device H small immersion areometers may be inserted to indicate the desired degree of concentration.

The process according to the invention has the advantage over the known processes that the dispersing agent which stabilizes the dispersion to a more or less high degree may be non ionic or anionic. There may also be used mixtures of dispersing agents whereby in many cases the foaming of the dispersions is reduced. Another advantage is the low content of emulsifier and the absence of electrolytes in the concentrated dispersion obtained. Still another advantage of the process according to the invention is the fact that polymer dispersions of any initial concentration may be used and practically any desired final concentration of the polymer dispersion can be attained.

The final concentration of solid substance only depends on the kind and the amount of the dispersing agent used and on the properties of the diluted dispersion used and it may amount to up to 80% by weight of solid substance. Dispersions having a final concentration of more than 80% by weight of solid substance can, in principle, also be prepared by the process according to the invention but they are difficult to handle because it is inter alia difficult to stir them and their flow properties are no longer good.

Although according to the invention there are preferably concentrated dispersions of polytetrafluoroethylene there may also be used any dispersion of a fluorinated olefin polymer, for example, dispersions containing a copolymer of tetrafluoroethylene and 1,1-difluoroethylene, of tetrafluoroethylene and ethylene, of tetrafluoroethylene and trifluorochloroethylene, of tetrafluoroethylene and vinyl acetate or of trifluorochloroethylene and 1,1-difluoroethylene.

In contradistinction to the known processes for preparing concentrated dispersions the process according to the present invention can be carried out continuously since the deposition of the dispersions does not take the relatively long time it takes in the known processes.

The concentrated dispersions which are obtained by the process according to the invention can be used for coating films, for impregnating certain sorts of paper, textiles and fiber glass material and for coating fibrous materials and wires.

The following examples serve to illustrate the invention but they are not intended to limit it thereto.

*Example 1*

19 grams of p-nonyl phenol polyethylene glycol ether were added to 1.5 kilograms of a polytetrafluoroethylene dispersion containing 26.5% by weight of solid substance. This mixture was heated in a 2-liter flask in vacuo to the boiling point without the use of a capillary tube, while stirring slowly (temperature about 30° C.). After 3½ hours, 961 grams of water had evaporated. 448 grams of concentrated polytetrafluoroethylene dispersion having a solids content of 71% by weight were obtained. There were only traces of coagulate.

*Example 2*

1.5 kilograms of a polytetrafluoroethylene dispersion having a solids content of 25.8% by weight were evaporated in vacuo, without the use of a capillary tube, together with 5.8 grams of the sodium salt of cogasin monosulfonic acid, while stirring. After 585 grams of water had been distilled off, 647 grams of stable polytetrafluoroethylene dispersion having a solids content of 60% by weight were obtained.

*Example 3*

In the manner described in Examples 1 and 2, 1.5 kilograms of a polytetrafluoroethylene dispersion having a solids content of 5% by weight were mixed with 3 grams of p-octyl phenol polyethylene glycol ether and evaporated in vacuo, while stirring. After 1.380 grams of water had been distilled off 122 grams of polytetrafluoroethylene dispersion having a solids content of 60% by weight were obtained.

*Example 4*

In the rotary apparatus shown in the accompanying drawing 18 kilograms of polytetrafluoroethylene dispersion having a solids content of 17.12% by weight were evacuated in vacuo while 164 grams of p-nonyl phenol polyethylene glycol ether were added. After 13.3 kilograms of water had passed over 4,860 grams of dispersion having a solids content of 66% by weight were obtained.

*Example 5*

13 kilograms of polytetrafluoroethylene dispersion having a solids content of 24.7% by weight to which 5% by weight, calculated on the solids content, of p-nonyl phenol polyethylene glycol ether had been added were concentrated in the apparatus illustrated by the accompanying drawing by distilling off the water in vacuo until the solids content of the dispersion was 60% by weight. Then about 753 grams per hour of dilute dispersion containing 5% by weight, calculated on the solids content, of p-nonyl phenol polyethylene glycol ether were introduced through inlet tube J in the course of about 63 hours and at H about 268 grams per hour of concentrated dispersion were drawn off. 60.3 kilograms of dilute dispersion thus yielded 22.85 kilograms of concentrated polytetrafluoroethlyene dispersion having a solids content of 67.4% by weight. Practically no coagulate had formed in the apparatus.

*Example 6*

140 grams of sodium lauryl sulfate and about 15 grams of coconut oil fat alcohol polyethylene glycol ether were added to 14.8 kilograms of polytetrafluoroethylene dispersion having a solids content of 22.2% by weight. This mixture was evaporated in vacuo in the apparatus shown in the accompanying drawing. After 9.3 kilograms of water had been distilled off 5.6 kilograms of polytetrafluoroethylene dispersion having a solids content of 60% by weight remained behind.

*Example 7*

16 grams of coconut oil fatty acid polyglycol ester were added to 1.5 kilograms of a dispersion of a copolymer, which dispersion had a solids content of 22.8% by weight and which copolymer had been prepared from 99% by weight of tetrafluoroethylene and 1% by weight of 1,1-difluoroethylene. The mixture was then evaporated in vacuo. 495 grams of a concentrated dispersion of the copolymer which had a solids content of about 69% by weight were obtained.

We claim:

1. A process for the manufacture of a concentrated dispersion of a fluorinated olefin polymer in water as the sole continuous phase which comprises adding 1 to 10 percent by weight, calculated on the solids content of the dispersion, of a surface-active agent of the group consisting of p-octylphenol-polyethyleneglycol ether and p-nonylphenol-polyethyleneglycol ether to a dilute dispersion of said fluorinated olefin polymer in water as the sole continuous phase and distilling the major portion of the water from the dispersion in vacuo at a temperature of 10 to 60° C. while preventing penetration of air or other gas into the dispersion.

2. A continuous process for the manufacture of a concentrated dispersion of a fluorinated olefin polymer in water as the sole continuous phase according to claim 1 which comprises carrying out the concentration of the dispersion continuously by adding fresh dilute aqueous dispersion to the dispersion already concentrated and simultaneously discharging concentrated dispersion at a rate equal to the rate of addition of dilute dispersion.

3. A process for the manufacture of a concentrated dispersion of polytetrafluoroethylene in water as the sole continuous phase which comprises adding 1 to 10 percent by weight, calculated on the solids content of the dispersion, of a surface-active agent of the group consisting of p-octylphenol-polyethyleneglycol ether and p-nonylphenol-polyethyleneglycol ether to a dilute dispersion of polytetrafluoroethylene in water as the sole continuous phase and distilling the major portion of the water from the dispersion in vacuo at a temperature of 10 to 60° C. while preventing the penetration of air or other gas into the dispersion.

References Cited by the Examiner

UNITED STATES PATENTS

| 2,710,266 | 6/1955 | Hochberg | 260—29.6 |
| 2,937,156 | 5/1960 | Berry | 260—29.6 |
| 3,037,953 | 6/1962 | Marks et al. | 260—29.6 |
| 3,105,824 | 10/1963 | Green et al. | 260—29.6 |
| 3,169,120 | 2/1965 | Capron et al. | 260—29.6 |

OTHER REFERENCES

Perry's Chemical Engineering Handbook, 3rd edition, p. 510 (1950), TP 155 P4.

MURRAY TILLMAN, *Primary Examiner.*

N. F. OBLON, J. L. WHITE, *Assistant Examiners.*